United States Patent
Fehlbaum et al.

(10) Patent No.: US 11,217,972 B2
(45) Date of Patent: Jan. 4, 2022

(54) INSTALLATION FOR HIGH-VOLTAGE ELECTRIC CABLES

(71) Applicant: NEXANS, Courbevoie (FR)

(72) Inventors: Jean Fehlbaum, Cortaillod (CH); Christian Mouchangou, Cortaillod (CH)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/864,975

(22) Filed: May 1, 2020

(65) Prior Publication Data
US 2020/0403389 A1    Dec. 24, 2020

(30) Foreign Application Priority Data
May 7, 2019   (FR) ..................... 19 04748

(51) Int. Cl.
*H02G 15/18*   (2006.01)
*H02G 3/04*    (2006.01)
*H01B 7/00*    (2006.01)

(52) U.S. Cl.
CPC ......... *H02G 3/0406* (2013.01); *H01B 7/0009* (2013.01); *H02G 3/0456* (2013.01); *H02G 15/18* (2013.01)

(58) Field of Classification Search
CPC ........ H02G 3/04; H02G 3/0406; H02G 15/18; H02G 3/0456; H01B 7/00; H01B 7/0009
USPC ...................................... 174/99 R
See application file for complete search history.

(56) References Cited

U.S. PATENT DOCUMENTS

| | | | | | |
|---|---|---|---|---|---|
| 2,261,742 A | * | 11/1941 | Matsumoto | ............ | H02G 15/26 174/21 R |
| 2,462,227 A | * | 2/1949 | Sauer | ....................... | H01R 4/56 403/47 |
| 3,096,485 A | * | 7/1963 | Chang | ...................... | H03F 7/04 330/4.6 |
| 3,219,501 A | * | 11/1965 | Volk | ........................ | H01B 7/18 156/53 |
| 3,321,568 A | * | 5/1967 | Venturelli | .............. | H02G 15/20 174/21 R |
| 3,333,044 A | * | 7/1967 | Toto | ......................... | H01R 9/11 174/15.7 |
| 3,441,660 A | * | 4/1969 | Garner | ..................... | H01B 9/00 174/102 SC |
| 3,770,871 A | * | 11/1973 | Goodman | ............. | H02G 15/24 174/11 R |

(Continued)

FOREIGN PATENT DOCUMENTS

| | | |
|---|---|---|
| JP | 2002 291126 | 10/2002 |
| JP | 2016 082639 | 5/2016 |
| JP | 2017 093278 | 5/2017 |

OTHER PUBLICATIONS

EU Search Report dated Oct. 24, 2019.
EU Search Report dated Aug. 11, 2020.

*Primary Examiner* — Timothy J Thompson
*Assistant Examiner* — Michael F McAllister
(74) *Attorney, Agent, or Firm* — Sofer & Haroun, LLP

(57) ABSTRACT

This installation has at least one electric cable (12) having three conductors. At least one cable duct contains at least one section of the cable (12) and at least one connection chamber (10) in which two sections of the cable (12) are connected by means of a connection joint (14). The cable (12) is a helical assembly of the three conductors which comprises neither armouring nor sheath around this assembly.

10 Claims, 3 Drawing Sheets

(56) References Cited

U.S. PATENT DOCUMENTS

| | | | | |
|---|---|---|---|---|
| 4,420,202 A | * | 12/1983 | Atakkaan | H01R 13/53 |
| | | | | 439/278 |
| 4,421,945 A | | 12/1983 | Moisson | |
| 5,575,667 A | | 11/1996 | Cegelec | |
| 5,817,979 A | | 10/1998 | O'Neill | |

* cited by examiner

INSTALLATION FOR HIGH-VOLTAGE ELECTRIC CABLES

This application claims the benefit of priority from French Patent Application No. FR 19 04748, filed on May 7, 2019, the entirety of which is incorporated by reference.

FIELD OF THE INVENTION

The present invention relates to an installation for high-voltage electric cables. "High voltage" is understood to mean voltage levels of the order of a few kV to several hundreds of kV.

The invention relates to the field of electric cables.

PRIOR ART

In urban electric cabling networks, the high-voltage electric cables are generally contained in cable ducts, typically made of thermoplastic material (polyethylene PE or polyvinyl chloride PVC).

A high-voltage cable is made to heat up under the effect of the current which circulates therein. This heating creates an elongation of the cable, which then has a tendency to "snake" inside the cable duct. This is why the cable manufacturers recommend maintaining a factor of generally between 1.5 and 2 between the outer diameter of the cable and the internal diameter of the cable duct.

Thus, the overall bulk of such installations is significant and can pose a problem. Moreover, the fill rate of the cable ducts, in terms of diameter, does not generally exceed 60 to 70% and is therefore not optimal.

OBJECTS AND SUMMARY

The aim of the present invention is to remedy the above-mentioned drawbacks of the prior art for the particular case of the three-core cables, thus comprising three conductors.

To that end, the present invention proposes an installation comprising at least one electric cable having three conductors, at least one cable duct containing at least one section of the at least one cable and at least one connection chamber in which two sections of the at least one cable are connected by means of a connection joint, this installation being noteworthy in that the at least one cable is a helical assembly of the three conductors which comprises neither armouring nor sheath around the assembly.

The fact that a cable is provided without sheath or armouring around the assembly of the three conductors offers several advantages. Not only does it make it possible to simplify the manufacture of the cable and therefore lower the manufacturing costs, but, also, it makes it possible to more efficiently exploit the possibilities of movement of the cable when it snakes in the internal volume of the cable because of its thermal elongation. Indeed, the three conductors are free to separate from one another to migrate individually towards the internal wall of the cable and adopt a trajectory that is more sinuous, and therefore longer than the initial trajectory.

Moreover, that makes it possible to increase the fill rate of the cable duct, in terms of diameter, to achieve a rate close to 90%. Furthermore, the ratio between the outer diameter of the cable and the internal diameter of the cable duct can be adjusted to approximately 1.1, which makes it possible to install cables of a greater dimension and therefore of a greater current-carrying capacity than previously in one and the same cable duct.

In a particular embodiment, the installation further comprises at least one retention element disposed around the at least one cable in the connection chamber.

The retention element makes it possible to clamp the three conductors in order to block them in the natural longitudinal movement linked to the heating thereof under the effect of the current. That makes it possible to guarantee that the thermal elongation of the cable remains contained within the cable duct and does not extend into the connection chamber.

In a particular embodiment, the installation comprises two retention elements placed respectively at the two opposite ends of the connection chamber.

Such a distribution of the retention elements makes it possible to balance the retention forces applied to the cable and further improve the control of the thermal elongation thereof.

In a particular embodiment, the retention element is a three-core clamp.

That makes it possible to house, in one and the same retention part, the three conductors of the cable, respectively in the three housings of the clamp.

In a particular embodiment, the connection joint is inserted almost equidistant from the opposite ends of the connection chamber.

That makes it possible to facilitate the joining of two cable sections, of which one and the same length will be available in the connection chamber.

In a particular embodiment, the installation further comprises at least one stiffening element fixed onto a segment of predetermined length of the at least one cable and/or of the connection joint, in the connection chamber.

The addition of a stiffening element, either in addition to the retention elements, or instead of the latter, makes it possible to contain the buckling of the three conductors and of the three sleeves of the connection joint which links the two cable sections in the connection chamber, this buckling being able to be generated by the residual elongation of the conductors between the two ends of the connection chamber.

According to a particular feature, the at least one stiffening element can comprise a rigid bar.

The effect produced by the fixing of such a bar to the cable and/or to the connection joint is comparable to that of a splint.

In a particular embodiment, the installation comprises a plurality of stiffening elements fixed onto segments of predetermined length of the at least one cable and of the connection joint.

That makes it possible to augment the securing of the assembly formed by the two cable sections and their connection joint in the connection chamber. Thus, even in the case where the resultant of the compression forces linked to the thermal heating was bound to be non-zero because of length disparities on either side of the junction point, that makes it possible to minimize the value of this resultant.

In a particular embodiment, the at least one cable duct comprises an internal wall and at least one sealing element blocking the space between the helical assembly of the three conductors and the internal wall in a watertight manner.

That makes it possible to prevent flows of water from the cable duct towards the connection chamber.

In a particular embodiment, the at least one cable duct is made of a thermoplastic material.

The invention is then particularly useful given that the thermoplastic materials require more control of the thermal elongation of the cables than metal cable ducts.

BRIEF DESCRIPTION OF THE DRAWINGS

Other aspects and advantages of the invention will become apparent on reading the following detailed description of particular embodiments, given as nonlimiting examples, with reference to the attached drawings, in which.

DESCRIPTION OF EMBODIMENTS

An installation according to the present invention comprises one or more electric cables, for example power cables, each of these cables having three conductors.

As is known per se, the installation also comprises one or more cable ducts or conduits, each of these cable ducts containing at least one section of one of the abovementioned cables, that is to say at least a part of the length of this cable.

As a nonlimiting example, the installation can be an underground power cable line. Such a line is composed of ranks of metal or thermoplastic cable ducts in which the cables are pulled and/or pushed.

Figure 1:
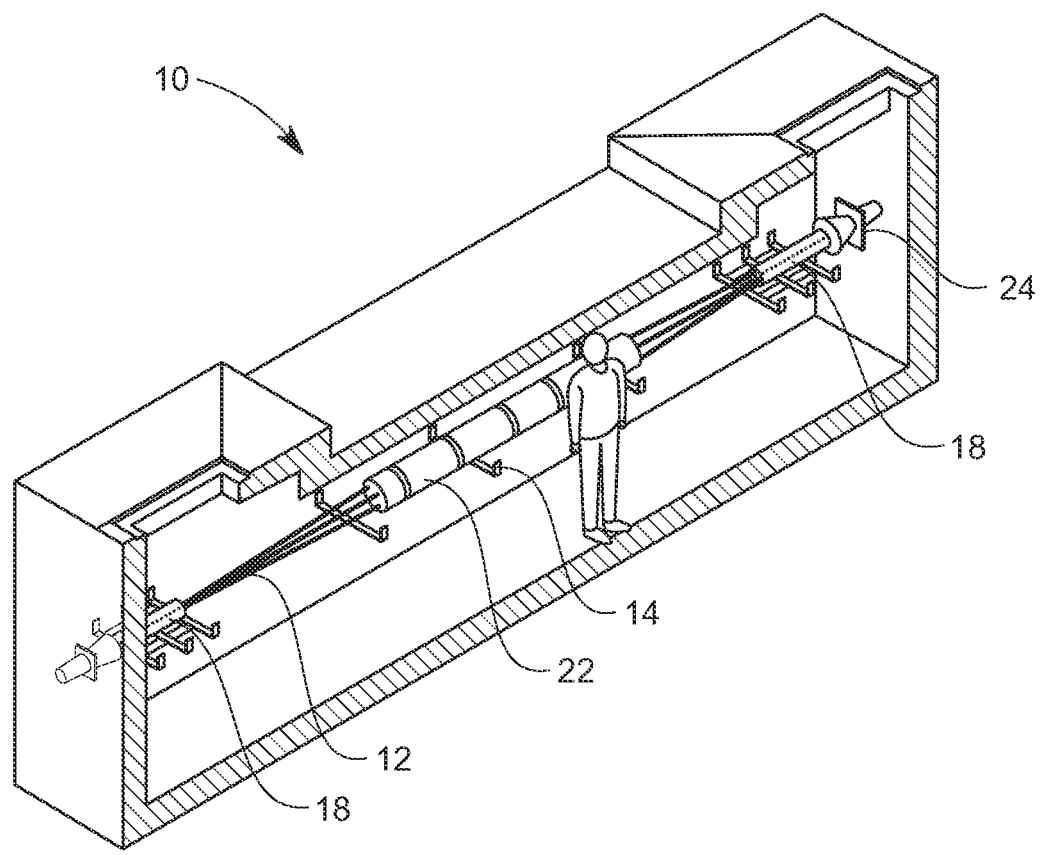
FIG. 1 is a perspective schematic view in longitudinal cross section of a connection chamber included in an installation according to the present invention, in a particular embodiment.

The installation according to the invention further comprises at least one connection chamber 10, also called junction chamber, as illustrated in FIG. 1. The cable ducts stop at the entry of each connection chamber 10, where two sections of a cable 12 are connected to one another by a connection joint 14, also called jointing sleeve.

As is known per se, the connection joint 14 serves to connect identical cables together and thus establish the continuity of the transmission characteristics, whether they be of electrical or optical nature. Furthermore, the connection joint 14 can also be designed to restore as far as possible the other characteristics of the cables themselves, such as mechanical strength, sealing, resistance to any attacks, aromatic and allopathic, from the environment, protection against ultraviolet rays for the cables exposed to solar radiation etc.

The connection joint 14 can for example be inserted almost at the centre of the connection chamber 10, that is to say approximately equidistant from the opposite ends of the connection chamber 10. Given that the cable 12 comprises three conductors 120, 121 and 122, the connection joint 14 is a triple joint, connecting each of the three conductors of the two cable sections to be connected.

Figure 2:
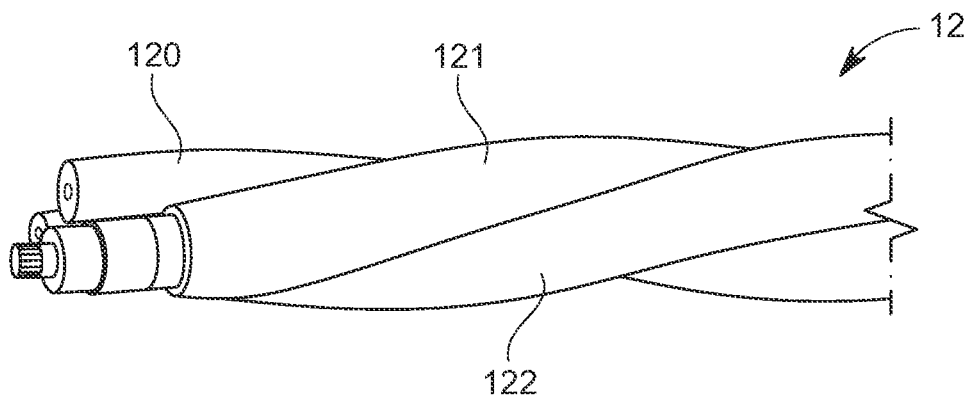
FIG. 2 is a schematic view of a portion of an electric cable included in an installation according to the present invention, in a particular embodiment.

According to the invention, the cable 12 is a simple helical assembly of the three conductors 120, 121 and 122 of which it is composed, as FIG. 2 shows. The cable 12 therefore has neither armouring nor sheath around this helical assembly.

Figure 3:
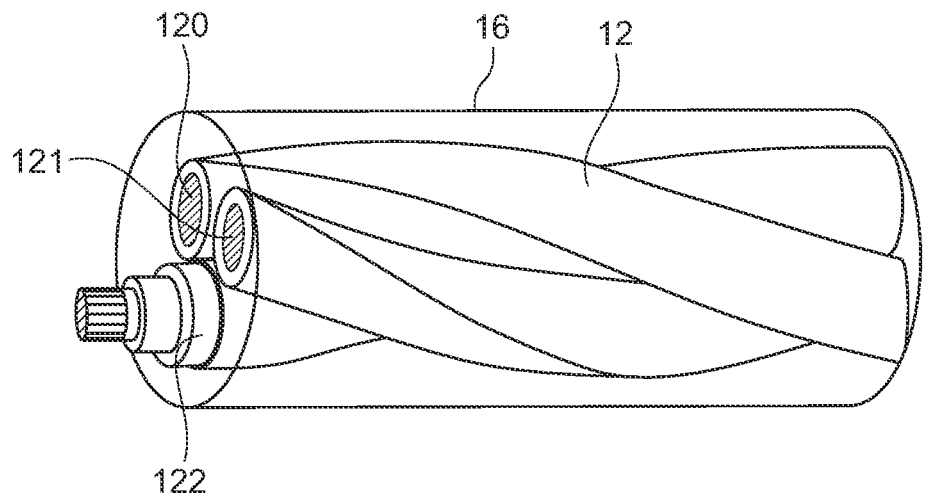
FIG. 3 is a transparent schematic view of a portion of electric cable contained in a cable duct, the cable and the cable duct being included in an installation according to the present invention, in a particular embodiment, when the temperature is low enough not to generate thermal elongation of the cable.
Figure 4:
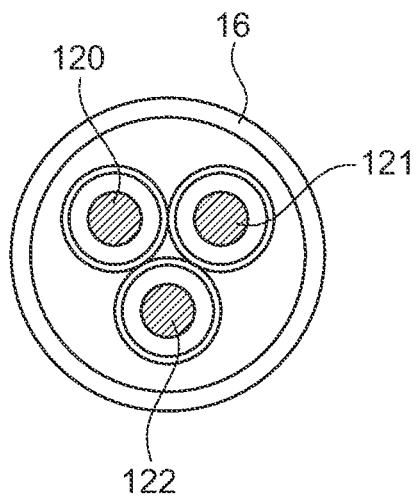
FIG. 4 is a sectional schematic view of the electric cable and of the cable duct of FIG. 3, when the temperature is low enough not to generate thermal elongation of the cable.
Figure 5:
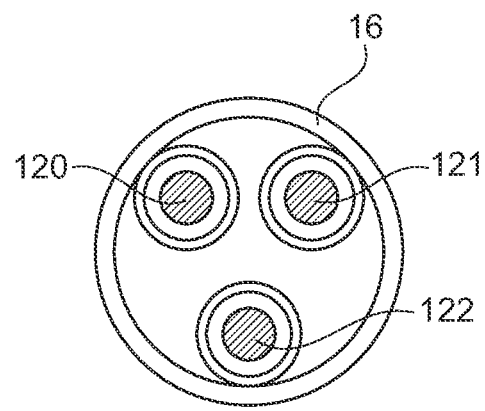
FIG. 5 is a sectional schematic view of the electric cable and of the cable duct of FIG. 3, when the temperature is high enough to generate a thermal elongation of the cable.

Thus, as FIGS. 3, 4 and 5 show, a cable duct 16 contains at least one section of the cable 12 which, at low temperature (typically 20° C., in the absence of current circulating in the cable), does not undergo thermal elongation and is therefore not in contact with the internal wall of the cable duct 16, the three conductors 120, 121 and 122 being in mutual contact (FIGS. 3 and 4) and, at maximum load (typically 90° C. on the conductors 120, 121 and 122), undergoes a thermal elongation which tends to provoke the displacement of the three conductors 120, 121 and 122 against the internal wall of the cable duct 16 (FIG. 5), thus adopting a trajectory that is more sinuous, therefore longer, within the cable duct 16.

The cable duct 16 can be produced in a metal material, for example made of steel. As a variant, it can be produced in a thermoplastic material, for example polyethylene PE.

In order to block the three conductors 120, 121 and 122 in the natural, longitudinal movement linked to the heating thereof under the effect of the current, the installation according to the invention can further comprise at least one retention element 18, also called mooring clamp, disposed around the cable 12 in the connection chamber 10 and making it possible to apply a clamping of the three conductors 120, 121 and 122. That guarantees that the thermal elongation of the conductors remains contained in the cable duct 16 and does not extend into the connection chamber 10.

This retention element 18 is installed in the connection chamber 10, for example at the cable duct outlet, that is to say at an entry of the connection chamber 10. It can for example have the cylindrical form illustrated in FIG. 6.

Figure 6:
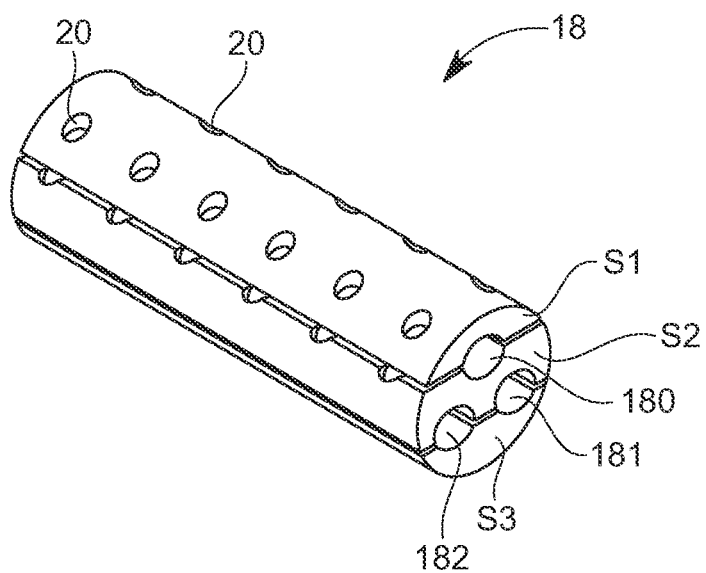
FIG. 6 is a perspective schematic view of a retention element included in an installation according to the present invention, in a particular embodiment.

In the embodiment of FIG. 6, the retention element 18 is a three-core clamp, that is to say it has three longitudinal channels 180, 181 and 182 intended to respectively receive the three conductors 120, 121 and 122 of the cable 12. Moreover, this cylindrical retention element 18 is produced in three longitudinal sections S1, S2 and S3, which facilitates the installation of the retention element 18 around the cable 12. The three longitudinal sections S1, S2 and S3 are assembled together by a plurality of assembly elements such as screws which are inserted into drill-holes 20.

In the particular embodiment of FIG. 1, the installation comprises two retention elements 18 placed respectively at opposite ends (or entries) of the connection chamber 10.

Moreover, in order to contain the buckling of three conductors 120, 121 and 122 and of the connection joint 14 which links the two cable sections in the connection chamber 10, buckling due to the residual elongation of the conductors between the two retention elements 18, the installation can further comprise at least one stiffening element 22, fixed onto a segment of predetermined length of the cable 12 and/or of the connection joint 14, in the connection chamber 10.

The stiffening element 22 can for example comprise a rigid bar or rigid stand. Advantageously, a plurality of stiffening elements 22 are fixed onto segments of predetermined length of the cable 12 and of the connection joint 14, between the two retention elements 18 in the particular embodiment of FIG. 1.

To each stiffening element 22 there are fixed, advantageously at short and regular intervals, both the upstream and downstream sections of the cable 12 and the connection joint 14. Thus, the stiffening elements 22 serve a purpose similar to that of an orthopaedic surgical splint and hold the duly connected elements together in the original position, thus limiting the risk of buckling of these elements. Advantageously, the stiffening elements 22 are fixed as straight as possible.

Furthermore, in order to prevent any flows of water from the cable duct 16 towards the connection chamber 10, the cable duct 16 can comprise, at the point where it stops at the entry of the connection chamber 10, at least one sealing element 24 blocking the space between the helical assembly of the three conductors 120, 121 and 122 and the internal wall of the cable duct 16 in a watertight manner. The sealing element 24, known per se, can consist of a set of mechanical parts, for example partially metal and partially made of synthetic material and can take any form that is deemed appropriate.

The invention claimed is:

1. An installation comprising:
    at least one electric cable having three conductors in a helical assembly in contact with one another,
    at least one cable duct containing at least one section of said at least one cable and
    at least one connection chamber in which two sections of said at least one cable are connected by means of a connection joint,
    wherein said at least one electric cable has neither armouring nor sheath around said assembly.

2. The installation according to claim 1, wherein said installation further comprises at least one retention element disposed around said at least one cable in said connection chamber.

3. The installation according to claim 2, wherein said installation comprises two retention elements placed respectively at opposite ends of said connection chamber.

4. The installation according to claim 2, wherein said at least one retention element is a three-core clamp.

5. The installation according to claim 1, wherein said connection joint is inserted approximately equidistant from the opposite ends of said connection chamber.

6. The installation according to claim 1, wherein the installation further comprises at least one stiffening element fixed onto a segment of predetermined length of said at least one cable and/or of said connection joint, in said connection chamber.

7. The installation according to claim 6, wherein said at least one stiffening element comprises a rigid bar.

8. The installation according to claim 6, wherein said installation further comprises a plurality of stiffening elements fixed onto segments of predetermined length of said at least one cable and of said connection joint.

9. The installation according to claim 1, wherein said at least one cable duct comprises an internal wall and at least one sealing element blocking the space between said helical assembly of said three conductors and said internal wall in a watertight manner.

10. The installation according to claim 1, wherein said at least one cable duct is made of a thermoplastic material.

* * * * *